(12) United States Patent
Oikawa et al.

(10) Patent No.: US 7,901,801 B2
(45) Date of Patent: Mar. 8, 2011

(54) PERPENDICULAR MAGNETIC RECORDING MEDIUM AND MAGNETIC RECORDING APPARATUS

(75) Inventors: Soichi Oikawa, Hachioji (JP); Tomoyuki Maeda, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 260 days.

(21) Appl. No.: 12/166,592

(22) Filed: Jul. 2, 2008

(65) Prior Publication Data

US 2009/0011281 A1 Jan. 8, 2009

(30) Foreign Application Priority Data

Jul. 4, 2007 (JP) ................................. 2007-176438

(51) Int. Cl.
G11B 5/66 (2006.01)
(52) U.S. Cl. ......................................... 428/827; 428/826
(58) Field of Classification Search .......................... None
See application file for complete search history.

(56) References Cited

U.S. PATENT DOCUMENTS

| 6,627,301 | B2* | 9/2003 | Shimizu et al. ............... 428/212 |
| 2003/0099869 | A1* | 5/2003 | Oikawa et al. .......... 428/694 TM |
| 2005/0129984 | A1* | 6/2005 | Bertero et al. .......... 428/694 TM |
| 2006/0177703 | A1* | 8/2006 | Takenoiri et al. ............. 428/829 |
| 2006/0222900 | A1 | 10/2006 | Inamura et al. |
| 2006/0222901 | A1 | 10/2006 | Inamura et al. |

FOREIGN PATENT DOCUMENTS

| JP | 03-160616 | | 7/1991 |
| JP | 10-334440 | | 12/1998 |
| JP | 2003-168207 | | 6/2003 |
| JP | 2006-048900 | | 2/2006 |
| JP | 2006048900 A | * | 2/2006 |
| JP | 2006-155861 | | 6/2006 |
| JP | 2008-243316 | | 10/2008 |

OTHER PUBLICATIONS

R. H. Victora et al. Composite Media for Perpendicular Magnetic Recording, IEEE Transactions on Magnetics, vol. 41, No. 2 Feb. 2005.*
Victora, et al., "Composite Media for Perpendicular Magnetic Recording"; IEEE Transactions on Magnetics, Vo. 41, No. 2, Feb. 2005, pp. 537-542.
Wang et al., "Exchange Coupled Composite Media for Perpendicular Magnetic Recording"; IEEE Transactions on Magnetics, vol. 41, No. 10, Oct. 2005, pp. 3181-3186.
Japanese Office Action dated Nov. 2, 2010.

* cited by examiner

*Primary Examiner* — Mark Ruthkosky
*Assistant Examiner* — Gary D Harris
(74) *Attorney, Agent, or Firm* — Pillsbury Winthrop Shaw Pittman, LLP (57) ABSTRACT

According to one embodiment, a perpendicular magnetic recording medium includes a substrate, and a first magnetic layer and a second magnetic layer formed on the substrate, in which supposing that, for the first and second magnetic layers, respectively, uniaxial magnetic anisotropy constants are $Ku_1$ and $Ku_2$, saturation magnetizations are $Ms_1$ and $Ms_2$, anisotropic magnetic fields are $Hk_1$ and $Hk_2$ and the thicknesses are $t_1$ and $t_2$, then following conditions are satisfied that $Ku_1$ and $Ku_2$ are $3\times10^6$ erg/cc or more, $Ms_1$ is smaller than $Ms_2$, $Hk_1$ is larger than $Hk_2$ and $t_1$ is larger than $t_2$.

12 Claims, 7 Drawing Sheets

FIG. 11

PERPENDICULAR MAGNETIC RECORDING MEDIUM AND MAGNETIC RECORDING APPARATUS

CROSS-REFERENCE TO RELATED APPLICATIONS

This application is based upon and claims the benefit of priority from Japanese Patent Application No. 2007-176438, filed Jul. 4, 2007, the entire contents of which are incorporated herein by reference.

BACKGROUND

1. Field

One embodiment of the invention relates to a perpendicular magnetic recording medium and a magnetic recording apparatus equipped with the perpendicular magnetic recording medium.

2. Description of the Related Art

For increasing recording density of a hard disk drive (HDD), the size of one bit on a magnetic recording medium needs to be reduced. In order to permit signals to be correctly read even when the bit size is reduced, the size of magnetic grains constituting a magnetic recording layer need to be reduced. However, when the grain size is reduced, energy necessary for holding the recorded magnetization direction is reduced in proportion to the volume of the grain. When the energy is close to the thermal energy at room temperature, magnetization may be reversed without recording with a magnetic head (thermal fluctuation phenomenon).

For preventing this phenomenon, it may be considered to increase energy necessary for magnetization reversal per unit volume (uniaxial magnetic anisotropy energy; Ku). In this case, since the head magnetic field necessary for recording is basically proportional to Ku, sufficient recording becomes impossible unless the head magnetic field is increased in response to the increase of Ku. However, since saturation magnetic flux density of the magnetic head is currently almost close to a physical limit as well as the pole tip size of the magnetic head is also reduced as the bit size is reduced, it has been substantially difficult to enhance recording ability of the head.

Thus, in the present situation, an attempt to reduce the grain size for enhancing the recording density brings about difficulty in recording. Therefore, such an approach has been required to reduce the magnetic field necessary for recording while thermal fluctuation resistance is enhanced.

Recently, a solution referred to as a composite media has been proposed which has a columnar grain comprising a hard magnetic (high Ku) region and a soft magnetic (low Ku) region in which the two regions are coupled through appropriate intensity of interaction (see R. H. Victora et al., IEEE Transactions of Magnetics, Vol. 41, p. 537). Upon applying an external magnetic field, two regions are not simultaneously reversed in this configuration because two regions are not directly exchange-coupled. That is, the magnetization of the soft magnetic region starts to be rotated, and after it is rotated by a certain degree, it exerts a force on the hard magnetic region through an appropriate interaction so that the magnetization the hard magnetic region is rotated, by which the two regions are reversed. When two regions are directly exchange-coupled, two regions are simultaneously reversed at a magnetic field (coercivity) corresponding to an averaged Ku upon application of an external magnetic field. It has been reported that, however, if the exchange coupling is appropriately weakened, the two regions are reversed at a smaller magnetic field (coercivity) than that mentioned above. There are many reports on the actually fabricated composite media and evaluation of characteristics thereof (see, for example, J. P. Wang et al., IEEE Transactions on Magnetics, Vol. 41. P. 3181). All the reports are based on the original proposal, and thus a soft magnetic region is used as one of the two regions.

The coercivity may be certainly reduced in the case where the coupling between two regions is appropriately weakened as compared with the case where two regions are directly coupled, but the degree of reduction in coercivity depends on Ku and saturation magnetization Ms of respective regions rather than the strength of the coupling. In this case, roughly speaking, the coercivity may be determined mainly by the average value of Ku weighted with the layer thicknesses.

When the coercivity (reversal magnetic field) is set to a maximum in the recordable range under the assumption that the head magnetic field has already been at an upper limit, the average value of Ku in the composite media is almost automatically determined, and therefore, it becomes important how the each Ku value is assigned to two regions.

From the concept of the so-called composite media, if Ku of the soft magnetic region is approximately zero, then Ku of the hard magnetic region can be twice as much the value where there is no soft magnetic region. In other words, the composite media enables to use a hard magnetic layer having higher Ku. However, the average Ku of the composite media is made considerably lower than Ku of the hard magnetic layer.

On the other hand, in a CoCrPt-oxide granular hard magnetic layer which is a main stream of the currently available perpendicular HDD media, Ku can be increased by reducing Cr, but SNRm (signal-to-noise ratio of the media) can be improved as well as Ms can be reduced by increasing Cr. Thus, the Cr composition is made rather higher and Ku is controlled in the order of $4\times10^6$ erg/cc. Though use of such a material as FePt alloy providing quite high Ku have been considered, this alloy is not expected to provide as high SNRm as a CoCrPt recording layer. Under the circumstances, it is substantially difficult to increase Ku of the hard magnetic layer.

Besides the above perpendicular magnetic recording media, those using two magnetic layers in the magnetic recording layer have been proposed (see Jpn. Pat. Appln. KOKAI Publication Nos. 2003-168207 and 2006-48900). However, these media have not reached to have high thermal stability as well as reduced recording magnetic field and improved signal-to-noise ratio.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is provided a perpendicular magnetic recording medium comprising: a substrate; and a first magnetic layer and a second magnetic layer formed on the substrate, wherein supposing that, for the first and second magnetic layers, respectively, uniaxial magnetic anisotropy constants are $Ku_1$ and $Ku_2$, saturation magnetizations are $Ms_1$ and $Ms_2$, anisotropic magnetic fields are $Hk_1$ and $Hk_2$ and the thicknesses are $t_1$ and $t_2$, then following conditions are satisfied that $Ku_1$ and $Ku_2$ are $3\times10^6$ erg/cc or more, $Ms_1$ is smaller than $Ms_2$, $Hk_1$ is larger than $Hk_2$ and $t_1$ is larger than $t_2$.

The magnitude of a reversal magnetic field expected from Ku in a magnetic layer is given by 2 Ku/Ms, and is referred to as an anisotropic magnetic field (Hk). The crucial point of the composite media is that magnetization of a soft magnetic region is reversed first. While the Ku value close to 0 is preferable for bringing Hk to approximately zero in terms of easiness of reversal, the soft magnetic region can be reversed first when Hk is smaller relative to Ms irrespective of Ku that is not always close to zero.

Accordingly, the inventors have devised to use a "hard" magnetic layer having high Ms and low Hk as a second magnetic layer in place of the soft magnetic layer in the composite media while a first magnetic layer basically remains as a currently used CoCrPt-oxide granular hard magnetic layer.

Lowering Hk of the second magnetic layer permits magnetization reversal of the layer to occur first, which accelerates magnetization reversal of the first magnetic layer, and it may be expected to reduce the reversal magnetic field (coercivity or a head magnetic field necessary for recording). Unlike simple theoretical calculation on the assumption that each of two regions has one magnetic moment, each region in real media is composed of a group of quite many atoms, namely magnetic moments. Accordingly, since directions of the moments in the region are not uniform, rotation of magnetization in the low Hk region starts at a portion remote from the interface of the two regions even when the regions are directly exchange-coupled. When interaction between two magnetic layers is weakened by providing a nonmagnetic intermediate layer between two magnetic layers, the magnetic field necessary for recording may be further reduced.

Thermal stability of the composite media can be enhanced in accordance with the increase of average Ku when the second magnetic layer has a more or less higher Ku than the first magnetic layer. Although thermal stability of the composite media may be the same order or a little decreased when Ku of the second magnetic layer is the same order as or a little lower than Ku of the first magnetic layer, the decrease of thermal stability may be prevented by thinning the second magnetic layer or by adjusting Ku of the first magnetic layer when Ku is in the order of sixth power of 10. High thermal stability can be expected without sacrificing freedom of the thickness provided that both the first and second magnetic layers have Ku of $3\times10^6$ erg/cc or more.

Accordingly, it may be possible by this method, using the granular hard magnetic layer of CoCrPt-oxide with a favorable SNRm, to reduce a magnetic field necessary for recording (or to improve overwrite (OW) characteristics) while maintaining the desired thermal fluctuation resistance or to improve thermal fluctuation resistance while maintaining the magnetic field necessary for recording.

According to the present invention, a magnetic recording medium improved in medium noise, thermal stability and overwrite characteristics and a magnetic recording apparatus improved in areal recording density can be provided by forming the perpendicular recording layer with two layers of the first and second magnetic layers, and by setting the conditions that $Ku_1$ and $Ku_2$ are $3\times10^6$ erg/cc or more, $Ms_1<Ms_2$, $Hk_1>Hk_2$ and $t_1>t_2$.

Embodiments of the present invention will be described in more detail below.

Figure 1:
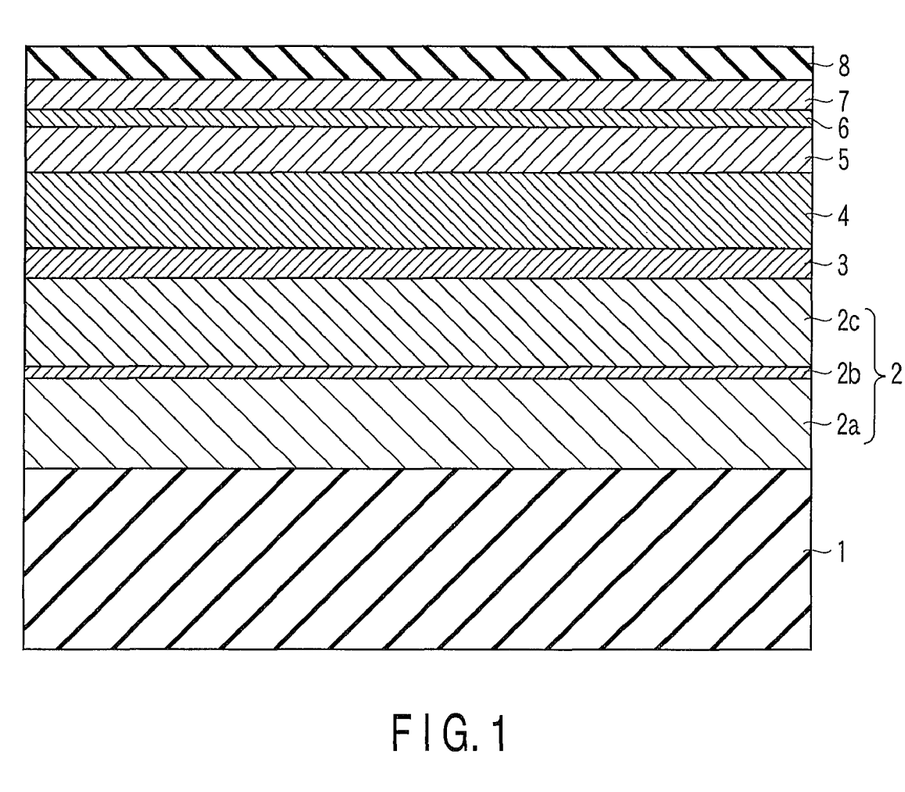
FIG. 1 is a cross-sectional view of a perpendicular magnetic recording medium according to one embodiment of the invention.

FIG. 1 is a cross-sectional view of a perpendicular magnetic recording medium according to one embodiment of the invention. The perpendicular magnetic recording medium has a structure in which, on a substrate 1, a soft magnetic underlayer 2, a seed layer 3, a nonmagnetic underlayer 4, a first magnetic layer 5, a nonmagnetic intermediate layer 6, a second magnetic layer 7 and a protective layer 8 are stacked. The soft magnetic underlayer 2 includes a lower soft magnetic layer 2a, a nonmagnetic intermediate layer 2b and an upper soft magnetic layer 2c. Favorable materials therefor will be described below.

<Substrate>

Examples of the substrate available include a glass substrate, an Al-based alloy substrate, a ceramic substrate, a carbon substrate and a Si single-crystal substrate having an oxidized surface. Examples of materials of the glass substrate include amorphous glass and crystallized glass. Examples of the amorphous glass available include commonly used soda lime glass and aluminosilicate glass. Examples of the crystallized glass include lithium-based crystallized glass. Examples of the ceramic substrate include sintered bodies containing commonly used aluminum oxide, aluminum nitride and silicon nitride as main components, and fiber-reinforced products thereof. Alternately, a metal or nonmetal substrate having a surface on which a NiP layer is formed by plating or sputtering may be used as the substrate.

<Soft Magnetic Underlayer>

The invention provides a so-called perpendicular double-layered medium having a soft magnetic underlayer with a high permeability and a perpendicular magnetic recording layer formed on the soft magnetic underlayer. The soft magnetic underlayer in the perpendicular double-layered medium serves a part of the function of a magnetic head by which a recording magnetic field from a magnetic head, for example, a single-pole head, for magnetizing the perpendicular magnetic recording layer is made to pass in a horizontal direction and to circulate it to the magnetic head side. The soft magnetic underlayer serves to apply a steep and sufficient perpendicular magnetic field to the magnetic recording layer, so as to improve read/write efficiency.

Materials containing, for example, Fe, Ni and Co may be used for the soft magnetic underlayer. Examples of these materials include FeCo-based alloys such as FeCo and FeCoV alloys; FeNi-based alloys such as FeNi, FeNiMo, FeNiCr and FeNiSi alloys; FeAl-based and FeSi-based alloys such as FeAl, FeAlSi, FeAlSiCr, FeAlSiTiRu and FeAlO alloys; FeTa-based alloys such as FeTa, FeTaC and FeTaN alloys; and FeZr-based alloys such as FeZrN alloy. Materials having a fine crystalline structures of FeAlO, FeMgO, FeTaN and FeZrN that contain 60 at % or more of Fe, or a granular structure in which fine crystal grains are dispersed in a matrix may be also used.

Other materials of the soft magnetic underlayer available are Co alloys containing Co and at least one of Zr, Hf, Nb, Ta, Ti and Y. The Co content is preferably 80 at % or more. Such a Co alloy tends to form an amorphous layer when a film is deposited by spattering, and exhibits quite excellent soft magnetism since the amorphous soft magnetic material involves no crystalline anisotropy, crystal defects and grain boundaries. Examples of such an amorphous soft magnetic material include alloys containing cobalt as a main component and zirconium as a subcomponent, for example, CoZr alloys such as CoZr-based, CoZrNb-based and CoZrTa-based alloys. Boron may be further added to the above materials in order to permit the amorphous structure to be readily formed.

When the amorphous material is used for the soft magnetic underlayer, the layer exerts almost no direct effect on crystal orientations of metal layers formed thereon, similarly to an amorphous substrate. Consequently, the structure and crystallinity of the magnetic recording layer are not largely affected even by changing the material, and basically the same magnetic characteristics and read/write characteristics may be expected. When the change is in an extent that only the third element is different as in the CoZr-based alloy, approximately the same magnetic characteristics and read/write characteristics may be obtained since the differences of saturation magnetization (Ms), coercivity (Hc) and magnetic permeability ($\mu$) are also small.

As shown in FIG. 1, the soft magnetic underlayer may be composed of a three-layered structure containing a lower soft magnetic layer, an antiferromagnetic coupling layer and an upper soft magnetic layer so that the lower soft magnetic layer and upper soft magnetic layer are antiferromagnetically coupled.

<Seed Layer>

A seed layer may be provided between the soft magnetic underlayer and the nonmagnetic underlayer in the perpendicular magnetic recording medium of the invention. Providing the seed layer can improve the crystal grain size and crystal orientation of the magnetic recording layer through the nonmagnetic underlayer. So long as thinning of the nonmagnetic underlayer is possible by the above-mentioned improvements, read/write characteristics can be also improved by reducing a distance (spacing) between the magnetic head and the soft magnetic underlayer. Since the seed layer may serve as an soft magnetic underlayer when the seed layer has soft magnetic characteristics, such a seed layer is favorable for further reducing the distance between the magnetic head and the soft magnetic underlayer.

The thickness of the seed layer is preferably from 0.1 to 20 nm, more preferably from 0.2 to 10 nm. When the layer has an average thickness of single atomic layer or less, the seed layer is not formed as a perfectly continuous layer even by depositing the layer as a completely uniform layer, but the effect for improving the crystal grain size and crystal orientation may be expected even when the layer has a structure in which the layer is dotted as islets. On the other hand, while there is no limitation of the maximum thickness in terms of spacing when the seed layer is a soft magnetic material having good characteristics, the spacing is only increased when the seed layer has no magnetism.

Metals of hcp and fcc structures are advantageous as the material of the seed layer for readily enhancing crystal orientation of the nonmagnetic underlayer, but an effect for reducing the crystal grain size of the nonmagnetic underlayer based on difference in the crystal structure with this underlayer may be expected even when metals of a bcc structure is used. Although the seed layer is not always essential, suitable materials of the seed layer, if necessary, may contain at least one selected from the group consisting of Pd, Pt, Ni, Ta and Ti, and alloys thereof, for example. These materials may be mixed, different elements may be mixed, or these materials may be stacked for further improving characteristics.

<Nonmagnetic Underlayer>

Ru, for example, may be used for the nonmagnetic underlayer. Ru is preferable in that it has the same hcp structure as Co that is a main component of the recording layer, and that lattice mismatch with Co is not too large as well as the grain size is small and grains are readily grown as columns.

Increasing the Ar gas pressure during deposition permits the grain size to be made finer as well as dispersion of the grain size to be improved, and separation of grains may be accelerated. In this case, crystal orientation may be impaired. This disadvantage is compensated by optionally combining with deposition of Ru that is likely to improve crystal orientation. It is preferable to lower the gas pressure at the first half of deposition and to increase the gas pressure at the latter half of deposition. The same effect may be expected so long as the gas pressure at the latter half is relatively higher than the gas pressure at the first half, and a pressure of 10 Pa or more is acceptable. With respect to the gas pressure ratio for depositing the layers, the layer deposited at a lower pressure is formed to be thick when priority is given to crystal orientation, while the layer deposited at a higher pressure is formed to be thick when priority is given to reduction in the grain size.

Separation of grains may be further accelerated by adding oxides. At least one selected from the group consisting of silicon oxide, chromium oxide and titanium oxide is particularly favorable as the oxide.

The thickness of the nonmagnetic underlayer is preferably from 2 to 500 nm, more preferably from 4 to 30 nm. A satisfactory continuous layer is not formed when the underlayer is too thin and crystallinity may be hardly enhanced not only in the Ru underlayer but also in other underlayers. It is thus difficult to improve the fine structure of the magnetic recording layer formed on the underlayer. Crystallinity may be readily enhanced by forming the underlayer thick, and a coercivity of the magnetic recording layer thereon may be readily increased. However, a too thick underlayer may cause deterioration of recording ability and recording resolution of the magnetic head due to an increase of spacing.

While the use of Ru has been mainly described above, the Co-based recording layer may have hcp (00.1) orientation by allowing the nonmagnetic underlayer to have (111) orientation even when a metal of an fcc structure is used for the nonmagnetic underlayer. Therefore, for example, Rh, Pd and Pt may be used by taking lattice mismatch with Co into consideration. An alloy composed of at least one selected from the group consisting of Ru, Rh, Pd and Pt and at least one selected from the group consisting of Co and Cr may be also used. Further, at least one selected from the group consisting of B, Ta, Mo, Nb, Hf, Ir, Cu, Nd, Zr, W and Nd, for example, may be added.

<Perpendicular Magnetic Recording Layer>

The first magnetic layer used in the invention is, for example, a ferromagnetic layer, and saturation magnetization Ms is preferably in the range of $200 \leq Ms < 700$ emu/cc.

CoPt-based alloys may be used, for example, as the first magnetic layer of the invention. The proportion of Co and Pt in the CoPt-based alloy is preferably from 2:1 to 9:1 in terms of providing high uniaxial crystalline magnetic anisotropy Ku. It is preferable that the CoPt-based alloy further contains Cr.

It is preferable that the first magnetic layer further contains oxygen. Oxygen may be added as an oxide. Suitable oxide is at least one selected from the group consisting of silicon oxide, chromium oxide and titanium oxide. With such oxide, the first magnetic layer is made to have a so-caller granular structure containing magnetic crystal grains comprising Co and grain boundary phases comprising amorphous oxides surrounding the crystal grains.

The magnetic crystal grain preferably has a columnar structure that perpendicularly penetrates the perpendicular magnetic recording layer. Crystal orientation and crystallinity of the magnetic crystal grains in the perpendicular magnetic recording layer may be improved by forming such a fine structure to consequently make it possible to provide a readout signal-to-noise ratio (S/N ratio) suitable for high density recording.

The oxide content for obtaining such a fine structure is preferably from 3 mol % to 20 mol %, more preferably from 5 mol % to 18 mol %, relative to the total of Co, Cr and Pt. The above-mentioned range of the oxide content of the perpendicular magnetic recording layer is preferable because amorphous grain boundaries having weak or almost no magnetism are formed around the magnetic crystal grains after forming the layer, and the amorphous grain boundaries serves for isolation and size reduction of the magnetic crystal grains.

When the oxide content of the first magnetic layer exceeds 20 mol %, the oxide remains in the magnetic crystal grains to impair orientation and crystallinity of the magnetic crystal grains while the oxide precipitates above and below the magnetic crystal grains. Consequently, the columnar structure of the magnetic crystal grains that perpendicularly penetrates the perpendicular magnetic recording layer tends to be prevented from being formed. When the oxide content is less than 3 mol %, on the other hand, separation and size reduction of the magnetic crystal grain becomes insufficient. Consequently, the proportion of the noise in readout increases to show a tendency for making it impossible to obtain a signal-to-noise ratio (S/N ratio) suitable for high density recording.

The Cr content of the first magnetic layer is preferably from 2 at % to 30 at %. The uniaxial crystalline magnetic anisotropy constant Ku of the magnetic crystal grains is not so largely reduced when the Cr content is within the above-mentioned range to enable high magnetization to be maintained. Consequently, read/write characteristics as well as sufficient thermal fluctuation characteristics suitable for high density recording are liable to be obtained. A Cr content exceeding 30 at % causes thermal fluctuation characteristics to be impaired due to small Ku of the magnetic crystal grains as well as readout signal output is impaired as a result of decreased magnetization, so that read/write characteristics tend to be deteriorated.

The Pt content of the first magnetic layer is preferably from 10 at % to 25 at %. The Pt content is determined in the above-mentioned range because it is suitable for obtaining Ku necessary for the perpendicular magnetic recording layer, for improving crystallinity and orientation of the magnetic crystal grains, and for obtaining thermal fluctuation characteristics and read/write characteristics suitable for high density recording.

When the Pt content exceeds 25 at %, a layer of the fcc structure is formed in the magnetic crystal grains, and crystallinity and orientation of the crystal grains tend to be impaired. When the Pt content is less than 10 at %, on the other hand, Ku tends to be out of the range necessary for obtaining thermal fluctuation characteristics suitable for high density recording.

The first magnetic layer may contain at least one or more elements selected from B, Ta, Mo, Cu, Nd, W, Nb, Sm, Tb, Ru and Re as subcomponents in addition to main components such as Co, Cr, Pt and oxides. Containing the above-mentioned elements permits size reduction of the magnetic crystal grains to be accelerated or crystallinity and orientation to be improved, thereby enabling read/write characteristics and thermal fluctuation characteristics suitable for high-density recording to be provided.

The total of the subcomponents is preferably 8 at % or less. When their content exceeds 8 at %, crystallinity and orientation of the magnetic crystal grains are disturbed by forming phases other than the hcp phase in the magnetic crystal grains, with the result that the first magnetic layer tends to fail in obtaining read/write characteristics and thermal fluctuation characteristics suitable for high-density recording.

Besides the above-mentioned alloys, the first magnetic layer may be other alloys of a CoPt-based alloy, CoCr-based alloy, CoPtCr-based alloy, CoPtO-based alloy, CoPtCrO-based alloy, CoPtSi-based alloy or CoPtCtSi-based alloy, or have a multilayer structure composed of a layer of an alloy containing at least one selected from a group consisting of Pt, Pd, Rh and Ru as a main component and a Co layer and a multilayer structure of CoCr/PtCr, CoB/PdB or CoO/RhO prepared by adding Cr, B or O to the above-mentioned multilayer structure. Anyhow, the perpendicular magnetic recording layer preferably contains Co as a main component since Co has an hcp structure with uniaxial crystalline magnetic anisotropy and permits a high coercivity to be readily obtained.

Unlike conventional composite media, the second magnetic layer used in the invention is a hard magnetic layer, and preferably has saturation magnetization Ms in the range of $700 \leq Ms \leq 1422$ emu/cc. Since an average Ms in the film of a practically used CoCrPt-oxide granular hard magnetic layer is less than 700 emu/cc, the second magnetic layer may be considered to have higher Ms when Ms is 700 emu/cc or more. While Ms of 1422 emu/cc as the bulk may be expected when an ideal continuous layer of pure Co could be formed, the average Ms in the film may be reduced in proportion to the packing density of crystal grains when a nonmagnetic grain boundaries are formed. For example, Ms becomes 711 emu/cc when pure Co is used at a packing density of 50%. Thus, the average Ms in the film varies depending on deposition conditions and the structure of the first magnetic layer.

Since high Ms and High Ku are required for the second magnetic layer, Co is preferably used as a main component while it is not preferable to use Cr since Ms tends to be largely decreased. A CoPt alloy may be used because, when Pt is added to Co, decrease of Ms is approximately proportional to the composition of Pt and Pt is able to enhance Ku. The Pt content is preferably from 0 at % to 25 at %. Since the second magnetic layer may be pure Co, the Pt content may be 0 at %. If the Pt content exceeds 25 at %, a layer of an fcc structure is formed in the magnetic crystal grains so that crystallinity and orientation of the hcp-CoPt alloy tends to be impaired. Pd shows similar tendency to Pt. The second magnetic layer may contain one or more elements selected from B, Ta, Mo, Cu, Nd, W, Nb, Sm, Tb, Ru and Re as subcomponents. Containing above-mentioned elements permits size reduction of magnetic crystal grains to be accelerated or crystallinity and orientation to be improved.

The uniaxial magnetic anisotropy constants $Ku_1$ and $Ku_2$ of the first and second magnetic layers are $3 \times 10^6$ erg/cc or more.

The thickness of the first magnetic layer is preferably from 3 to 40 nm, more preferably from 5 to 20 nm. This range permits the magnetic recording apparatus to work as an apparatus more suitable for high density recording. When the thickness of the first magnetic layer is less than 3 nm, noise components tend to be higher due to low crystal orientation, insufficient segregation and too low read output. When the thickness of the first magnetic layer exceeds 40 nm, on the other hand, waveform tends to be distorted due to too high read output. The second magnetic layer preferably has a thickness from 1 to 10 nm.

The coercivity of the perpendicular magnetic recording layer is preferably 237,000 A/m (3,000 Oe) or more. Thermal fluctuation resistance tends to be poor when the coercivity is less than 237,000 A/m (3,000 Oe).

A perpendicular squareness (Mr/Ms) of the perpendicular magnetic recording layer is preferably 0.8 or more. Thermal fluctuation resistance tends to be poor when the perpendicular squareness is less than 0.8.

<Protective Layer>

The protective layer protects the perpendicular magnetic recording layer from being corroded and the surface of the medium from being damaged when the magnetic head contacts the medium. Examples of the material of the protective layer include C, $SiO_2$ and $ZrO_2$. The thickness of the protective layer is preferably from 1 to 10 nm. This thickness is favorable for high density recording since the distance between the magnetic head and the medium is reduced.

A lubricant layer (not shown) may be provided on the protective layer. Examples of the lubricant available for the lubricant layer include those materials known in the art such as perfluoropolyether, fluorinated alcohols and fluorinated carboxylic acids.

<Magnetic Recording Apparatus>

Figure 2:
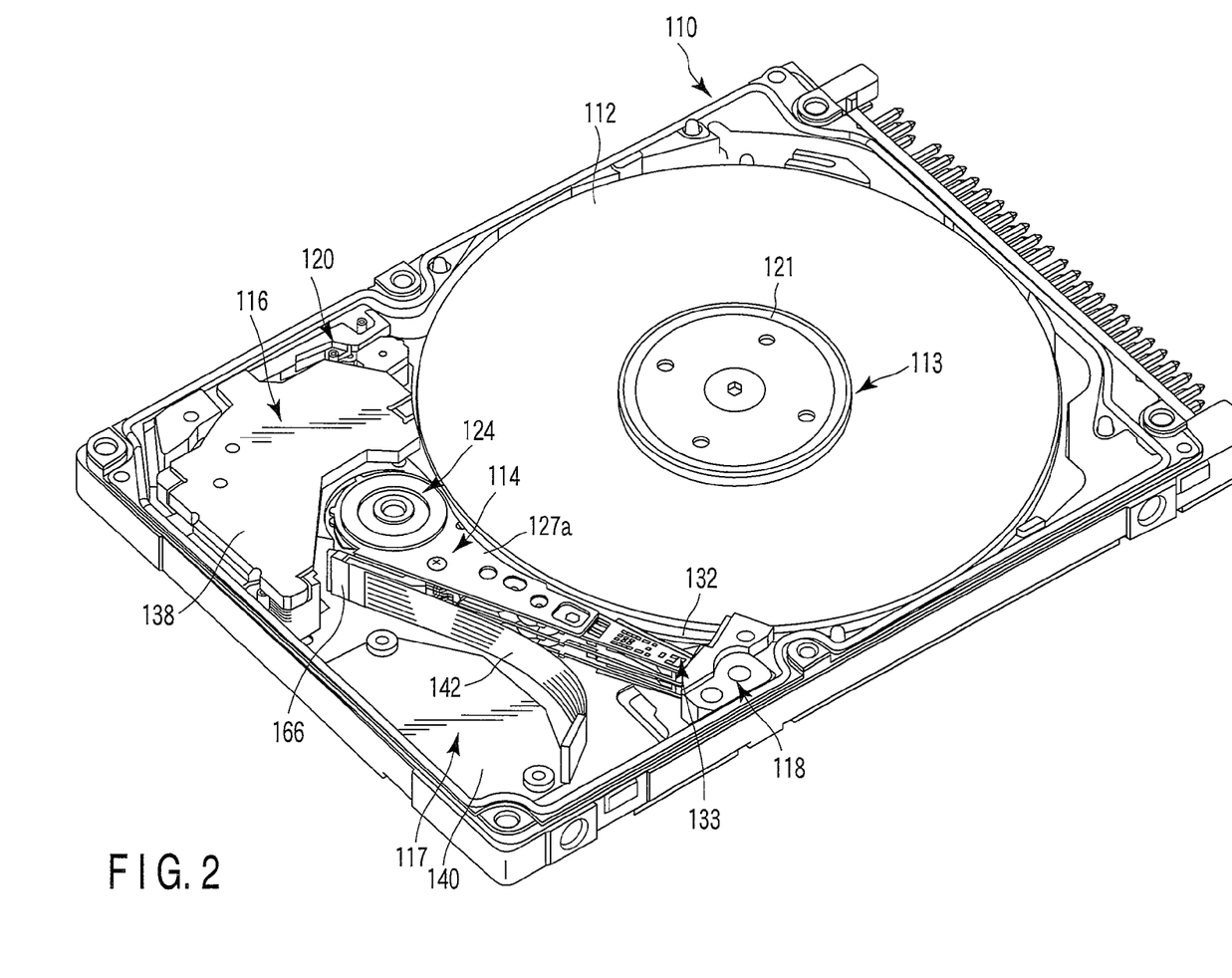
FIG. 2 is a partially exploded perspective view of the magnetic recording apparatus according to one embodiment of the invention.

FIG. 2 is a partially exploded perspective view showing an example of the magnetic recording apparatus of the embodiment.

As shown in the drawing, a hard disk drive (referred to as HDD hereinafter) as a disk apparatus has a case 110 of a rectangular box having an open top face, and a top cover (not shown) for closing the open top face of the case by being fixed to the cover with screws.

Accommodated in the case 110 are a magnetic disk 112 as a recording medium, a spindle motor 113, a magnetic head 133, a head actuator 114, a voice coil motor (referred to as VCM hereinafter) 116, a lamp road mechanism 118, an inertia latch mechanism 120, and a flexible printed circuit board unit (referred to as FPC unit hereinafter) 117. The spindle motor 113 supports and rotates the magnetic disk 112. The magnetic head 133 reads data from and writes data on the magnetic disk. The write head is a single-pole type, for example. The head actuator 114 supports the magnetic head 133 so that it is freely movable over the magnetic disk 112 according to the invention. The VCM 116 positions the head actuator by allowing the head actuator to rotate around a pivot 124. The lamp road mechanism 118 holds the magnetic head 133 at a position remote from the magnetic disk 112 when the magnetic head moves to the outermost periphery of the magnetic disk. The inertia latch mechanism 120 holds the head actuator at an unload position when, for example, the HDD is impacted. The FPC unit 117 has electronic parts such as a preamplifier mounted thereon.

A printed circuit board (not shown) for controlling the action of the spindle motor 113, VCM 116 and magnetic head via the FPC unit 117 is screwed on the outer surface of the case 110, and is positioned facing the bottom wall of the case.

The magnetic disk 112 having a magnetic recording layer is formed, for example, to have a diameter of 65 mm (2.5 inches). The magnetic disk 112 is fitted to a hub (not shown) of the spindle motor 113 while it is clumped with a clump spring 121. The magnetic disk 112 is made to rotate at a predetermined speed with a spindle motor 113 as a drive unit.

The magnetic head 133 is a so-called composite head formed on an approximately rectangular slider (not shown). The magnetic head 133 has a write head of a single-pole structure, a read head using a GMR film or TMR film. The slider together with the magnetic head is fixed with a gimbal formed at the tip of the suspension 132.

Examples of the invention will be described below.

EXAMPLE 1

<Manufacture of Perpendicular Magnetic Recording Medium>

A washed disk-shape glass substrate (manufactured by OHARA Co., outer diameter: 2.5 inches) was prepared as a non-magnetic substrate. The glass substrate was placed in a deposition chamber of a magnetron sputtering apparatus (trade name: C-3010, manufactured by CANON ANELVA Co.) and, after evacuating the deposition chamber to a reduced pressure of $2 \times 10^{-5}$ Pa or less, magnetron sputtering was performed as follows in an Ar atmosphere at a gas pressure of about 0.6 Pa, unless otherwise stated.

On the nonmagnetic substrate, a CoZrNb alloy layer with a thickness of 30 nm, a Ru layer with a thickness of 0.7 nm and a CoZrNb alloy layer with a thickness of 30 nm were sequentially deposited as a soft magnetic underlayer. These two CoZrNb layers are antiferromagnetically coupled via the Ru layer formed therebetween. A Pd seed layer with a thickness of 6 nm was then formed on the CoZrNb layer. Subsequently, after forming a Ru layer with a thickness of 10 nm and increasing the argon gas pressure to 6 Pa, a Ru layer with a thickness of 10 nm was further stacked to form a nonmagnetic underlayer with a total thickness of 20 nm. Then, a first magnetic layer, a nonmagnetic intermediate layer and a second magnetic layer were sequentially stacked to form a perpendicular magnetic recording layer.

The first magnetic layer was formed at a thickness of 15 nm by sputtering in an Ar atmosphere at a pressure of 6 Pa using a composite target of (Co-16 at % Pt-10 at % Cr)-8 mol % $SiO_2$. The thickness thereof was 15 nm.

A Pt layer with a thickness of 1 nm was deposited as a nonmagnetic intermediate layer.

The second magnetic layer was formed as a layer of Co-30 vol % $SiO_2$ (design value) with a thickness of 3 nm by co-sputtering independent targets of Co and $SiO_2$. While co-sputtering was used for the reason that the composition may be readily changed, using the composite target is considered to be preferable without any possibility of time lag of discharge and in terms of homogeneity of the composition, reproducibility, particle production and the like.

Subsequently, a carbon protective layer with a thickness of 6 nm was deposited. After stacking layers from the underlayer to the protective layer as described above, the substrate was taken out of the deposition chamber, and a lubricant layer made of perfluoropolyether with a thickness of 1.5 nm was formed on the protective layer by dipping to obtain a perpendicular magnetic recording medium. The perpendicular magnetic recording medium obtained has the configuration of FIG. 1 except that the lubricant layer is not shown in the drawing.

<Sectional TEM (Transmission Electron Microscope) Measurement>

The cross section of the perpendicular magnetic recording medium was observed by sectional TEM in order to investigate the fine structure of the perpendicular magnetic recording medium obtained. The grain size is hardly evaluated by section TEM due to overlap of grains in the transmission direction of the electron beam. However, the grain size of the Ru underlayer seemed to be from 8 to 10 nm, and formation of amorphous grain boundaries formed of oxide and size reduction of crystal grains were observed in the first magnetic layer. While the interface between the nonmagnetic intermediate layer and the second magnetic layer on the first magnetic layer is hardly discriminated mainly due to too small thickness of the layers, it was observed that columnar grains were epitaxially grown from the Ru underlayer to the second magnetic layer.

<Measurement of Read/Write Characteristics>

The read/write characteristics were evaluated using a read/write analyzer and a spin stand (manufactured by GUZIK Co.).

A composite head for perpendicular recording was used for read/write of information, wherein the composite head is provided with a giant magnetoresistive (GMR) read element and a single-pole (shielded pole) write element formed so that the auxiliary pole extends to near the main pole. While the write element of the shielded pole type was used herein, a conventional magnetic write element of a single-pole type having an auxiliary pole remote from a main pole may be also used. While CoFeNi was used as the material of the write pole, materials such as CoFe, CoFeN, NbFeNi, FeTaZr and FeTaN may be used. Additive elements may be further added to these magnetic materials as main components.

When the overwrite characteristics and readout signal-to-medium noise of the perpendicular recording medium were measured, good values of −44.3 dB and 22.2 dB, respectively, were obtained.

The overwrite characteristics as used herein are defined as "the ratio of (readout signal intensity of 60 kFCI data when data are written at a linear recording density of 450 kFCI on data written at a linear recording density of 60 kFCI)/(original readout signal intensity of 60 kFCI data)", and is an index to what extent the original data are clearly erased or the data are overwritten (abbreviated as OW hereinafter). The readout signal-to-medium noise ratio is referred to as a ratio of "a square average of (amplitude of signals when data are recorded at a linear recording density of 75 kFCI)/(medium noise when data are recorded at a linear recording density of 900 kFCI" (abbreviated as SNRm hereinafter).

<Measurement of Magnetization Curve>

For investigating magnetic characteristics of the perpendicular magnetic recording medium obtained, a magnetization curve was measured using a polar Kerr effect evaluation apparatus (manufactured by NEO-ARC Co.), a vibrating sample magnetometer (VSM) (manufactured by RIKEN DENSHI Co.) and a vector VSM (manufactured by ADE TECHNOLOGIES Co.).

The polar Kerr effect evaluation apparatus is able to measure the magnetization curve of the perpendicular magnetic recording medium with a soft magnetic underlayer itself, but it is impossible to measure saturation magnetization Ms. Since VSM measures the perpendicular magnetic recording layer as well as the soft magnetic underlayer, both layers are not necessarily evaluated independently. Accordingly, the soft magnetic underlayer is not deposited when Ms is measured with VSM. Instead, a sample on which a NiTa layer having substantially no magnetism is formed is used for obtaining almost the same magnetization curve.

Any of the following magnetization curves are the results of measurement in the direction perpendicular to the film plane unless otherwise stated. The standard sweep time for measuring the major loop was 45 seconds for the polar Kerr effect evaluation apparatus, 3 minutes for VSM and 40 minutes for vector VSM.

Figure 3:
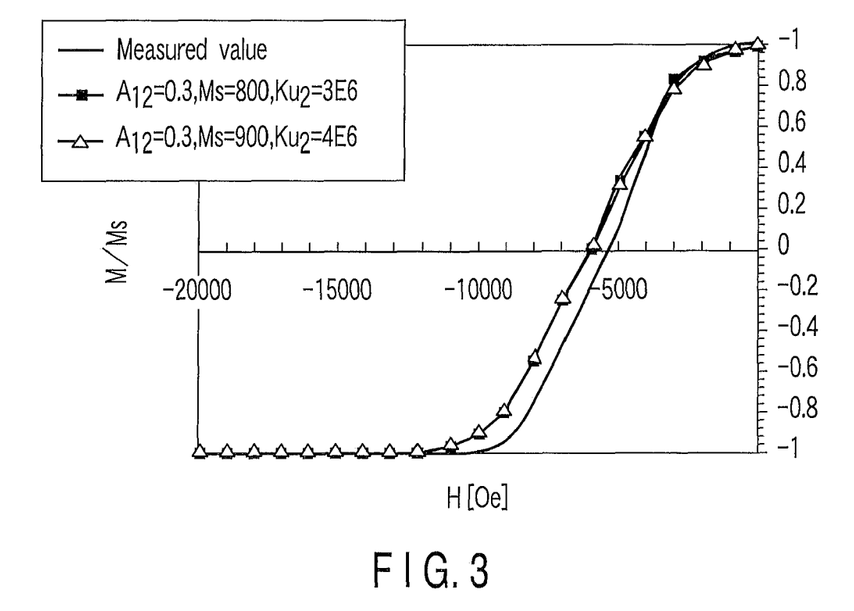
FIG. 3 is a magnetization curve of a perpendicular magnetic recording medium in Example 1.

FIG. 3 shows the magnetization curve of the perpendicular magnetic recording medium according to Example 1. The solid line represents the result of measurement, while square plots and triangular plots represent the results of calculation (the calculation method will be described below). The perpendicular squareness (Mr/Ms) is approximately 1, and the magnetic field (Hn) where M starts to decrease is as large as from 2 to 3 kOe while the saturation magnetic field Hs (a magnetic field under which reversal of all grains is completed) is as small as 10 kOe or less. This means that the characteristics of the medium as the perpendicular magnetic recording medium are quite excellent.

Figure 4:
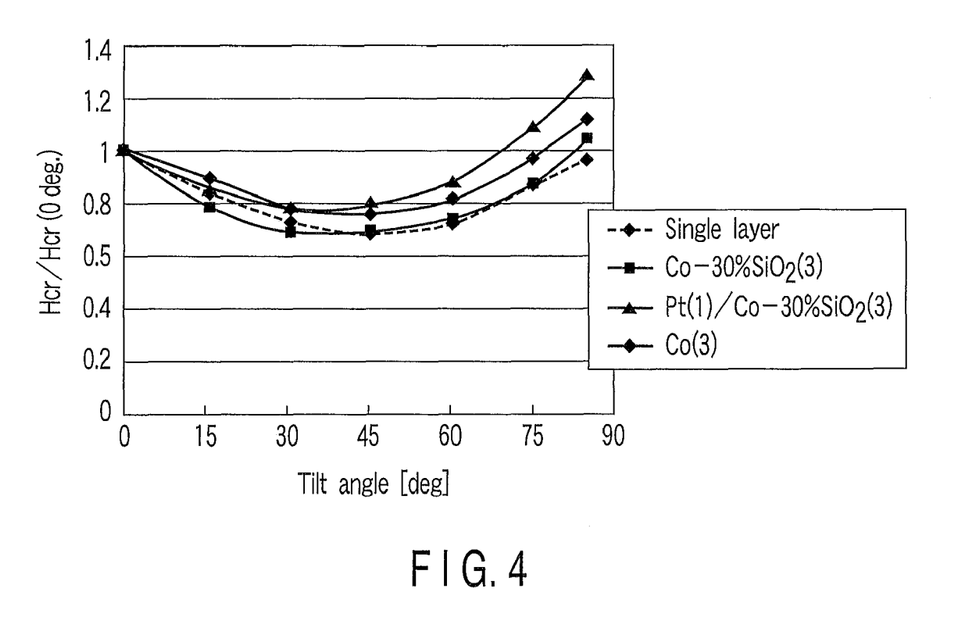
FIG. 4 is a graph showing tilt angle dependency of a remanent coercivity of the perpendicular magnetic recording medium in Example 1.

FIG. 4 shows the results of plotting a remanent coercivity (Hcr) against the angle of the magnetic field when the remanent magnetization curve of the perpendicular magnetic recording medium according to Example 1 was measured by changing the angle of the applied external magnetic field from the perpendicular direction. The triangular plots show the results of measurement, and other results of measurement will be described hereinafter. While the results are normalized by the value at 0° for the convenience of comparison with other results of measurement, it is shown that the remanent coercivity (Hcr) is larger at an angle of about 70° or more than that at an angle of 0°. Since tilt angle dependency by which Hcr continues to increase as the angle increases from 0° is shown in the result of calculation of the originally proposed composite media (R. H. Victora et al., IEE Transactions on Magnetics, Vol. 41, p. 537), Hcr seems to exhibit a tendency close to the result of the above-mentioned report.

Figure 5:
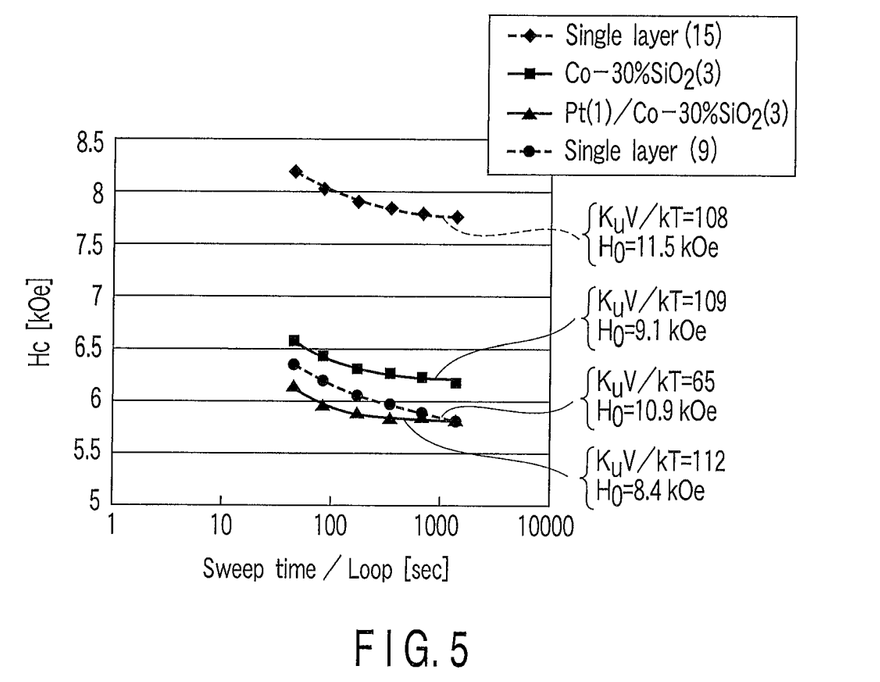
FIG. 5 is a graph showing sweep time dependency of the coercivity of the perpendicular magnetic recording medium in Example 1.

FIG. 5 shows sweep time dependency of the coercivity Hc of the perpendicular magnetic recording medium according to Example 1. Triangle plots show the results of measurement. Other results of measurements will be described hereinafter. This result was subjected to fitting using a so-called Sharrock's equation (M. P. Sharrock, IEEE Transactions on Magnetics, Vol. 35, p. 4414) in order to determine the coercivity $H_0$ at 1 ns that is close to the magnetization reversal rate with the head and vKu/kT as an index of thermal fluctuation resistance (where v is an activation volume (an average value of the minimum unit of magnetization reversal), Ku is a uniaxial magnetic anisotropy constant, k is Boltzmann's constant, and T is absolute temperature). Values of $H_0$=8.4 kOe and vKu/kT=112 were obtained. Since the lower limit of vKu/kT is considered to be about 60 from the retention time of recorded magnetization in the HDD, it has been shown that the thermal fluctuation resistance of the perpendicular magnetic recording medium is sufficiently high.

COMPARATIVE EXAMPLE 1

A perpendicular magnetic recording medium was manufactured in the same manner as in Example 1, except that the nonmagnetic intermediate layer and second magnetic layer were not deposited.

When read/write characteristics of the perpendicular magnetic recording medium obtained were measured as in Example 1, the values of −24.0 dB and 20.5 dB for OW and SNRm, respectively, were obtained. While the value of OW is insufficient for recording, the potential of Comparative Example 1 itself is not necessarily inferior to that of Example 1 in terms of a decreasing tendency of SNRm as compared with the case in which sufficient recording is possible. However, since the decrease of SNRm, if any, caused by provision of the nonmagnetic intermediate layer and the second magnetic layer in Example 1 may be considered to be small, higher SNRm as well as improvement of OW may be obtained in Example 1.

Figure 6:
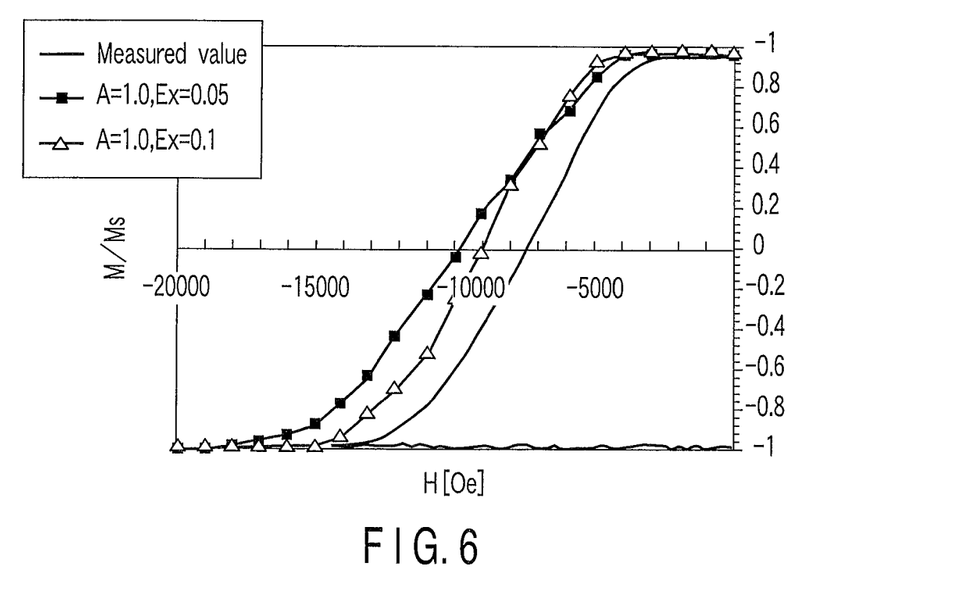
FIG. 6 is a magnetization curve of a perpendicular magnetic recording medium in Comparative Example 1.

FIG. 6 shows the results of measurement of the magnetization curve of the perpendicular magnetic recording medium according to Comparative Example 1. The solid line represents the result of measurement, and square plots and triangle plots represent the results of calculation (the calculation method will be described hereinafter). While it is reasonable that the perpendicular squareness (Mr/Ms) is approximately 1 and Hn is larger than that in Example 1, Hc of 7 kOe or more and Hs of about 13 kOe seem to be too large for sufficient recording with the head used in this example. Therefore, OW is considered to be deteriorated.

Tilt angle dependency of the remanent coercivity Hcr of the perpendicular magnetic recording medium according to Comparative Example 1 is denoted by rhombic plots (broken line) in FIG. 4. Hcr at an angle of 85° is approximately 1, and it is shown that the curve is downwardly depressed symmetrically at an angle of 45° as a center. Since the relative value of Hcr at 45° is 0.5 in a magnetization reversal model (Stoner-Wohlfarth model) of single magnetic domain grains having uniaxial magnetic anisotropy, magnetic grains of the magnetic recording layer may be considered to form a single magnetic domain as a whole, although there may possibly be some non-ideal portions.

On the contrary, while the normalized Hcr in Example 1 shows a tendency to be larger than that in Comparative Example 1 in the higher angle side as described above, angle dependency of Example 1 seems to resemble to that in Comparative Example 1 that is approximated by the SW model, taking the fact into consideration that Hcr at 0° accounts for 3.5 times of Hcr at 80° in the result of calculation of the originally proposed composite media (R. H. Victora et al., IEEE Transactions on Magnetics, Vol. 41, p. 537).

An apparent change is expected to appear at the edge of the recording bit in the cross-track direction where the magnetic field from the head is readily spread when the angle dependency of Hcr is largely different. However, the change of the recording track width actually observed in Example 1 and Comparative Example 1 was not larger than the change predicted from the difference of OW. Although the resolution in the linear direction may be considered to be readily affected in the shielded pole type write element with relatively high magnetic fields in the in-plane direction, no evident change in the resolution was also observed. This means that the angle dependency in Example 1 may be comprehended to resemble to the angle dependency in Comparative Example 1 with respect to read/write characteristics. This seems to be rather preferable in that the currently available head designed based on magnetization reversal in the SW model may be used without large modification.

Sweep time dependency of the coercivity Hc of the perpendicular recording medium according to Comparative Example 1 is shown by rhombic plots (broken line) in FIG. 5. As a result of fitting as in Example 1, $H_0$=11.5 kOe and vKu/kT=108 were obtained, which means the thermal fluctuation resistance is approximately the same as in Example 1. While abbreviation of "vKu" is used herein since it is often commonly used, it is practically accurate to call it as an energy barrier $\Delta E$ of magnetization reversal. Therefore, "vKu" is decomposed to "v" and "Ku". While v is increased and Ku is decreased when the result in Example 1 is decomposed into "v" and "Ku", it is not appropriate to compare the result of Example 1 with the result of Comparative Example 1 since magnetization reversal of the composite media is different from that of the SW model. It is reported that the energy barrier ratio against the reversal magnetic field is improved (R. H. Victora et al., IEEE Transaction on Magnetics, Vol. 41, p. 537) and that easiness of recording is improved while the thermal fluctuation resistance is maintained (J. P. Wang et al., IEEE Transaction on Magnetics, Vol. 41, p. 3181). This means that a large decrease of $H_0$ may be achieved at approximately the same vKu/kT in Example 1 to enable good OW to be obtained, while $H_0$ is so high that OW is insufficient in Comparative Example 1.

The sweep time dependency of a medium, in which the thickness of the first magnetic layer was reduced to as thin as 9 nm in Comparative Example 1 in order to permit Hc to come to close to that in Example 1, is shown by a circular plots in FIG. 5 as a reference. The sweep time dependency is increased with large decrease of thermal fluctuation resistance mainly by the decrease of v, although decrease of Ku seems to be responsible. Thus, it is found that $H_0$ obtained by extrapolation is not so largely decreased from $H_0$ when the thickness of the first magnetic layer is 15 nm. In other words, characteristics as in Example 1 are not obtained even by adjusting magnetic characteristics merely by the first magnetic layer when the sweep time is slow.

Accordingly, it has been shown that OW and ANRm may be improved by configuring the magnetic recording layer as in Example 1 while the angle dependency of Hcr and thermal fluctuation resistance remain unchanged.

EXAMPLE 2

A perpendicular magnetic recording medium was manufactured in the same manner as in Example 1, except that the thickness of the nonmagnetic intermediate layer was changed in the range from 0 to 2 nm.

When read/write characteristics were measured as in Example 1 with respect to the perpendicular magnetic recording medium in which the thickness of the nonmagnetic intermediate layer was 0 nm (no intermediate layer was formed), the values of OW and SNRm were −40.3 dB and 22.0 dB, respectively. Since OW is lowered from that in Example 1 and is not in a level insufficient for recording with approximately the same SNRm in Example 1, the medium may be considered to be acceptable in terms of read/write characteristics.

Figure 7:
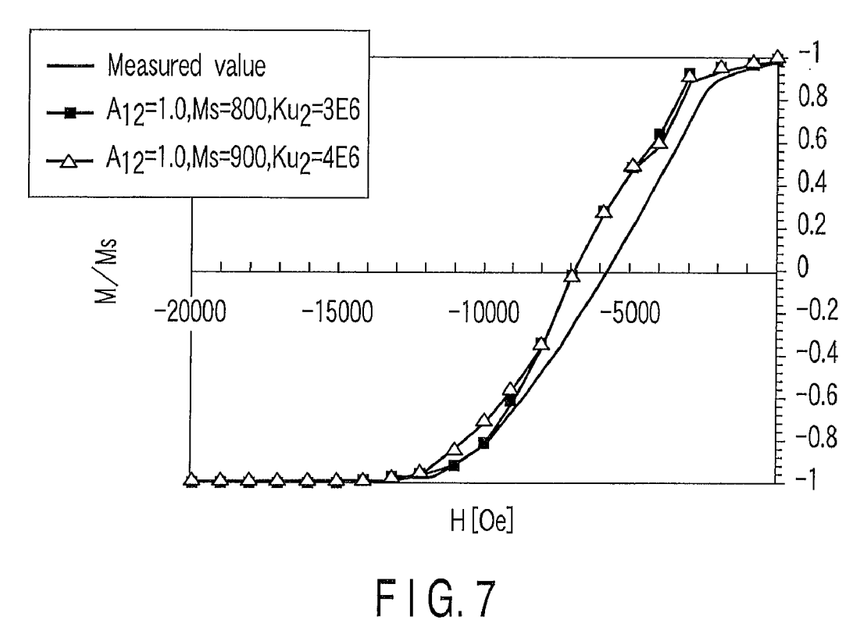
FIG. 7 is a magnetization curve of a perpendicular magnetic recording medium having no nonmagnetic intermediate layer in Example 2.

FIG. 7 shows the results of measurement of the magnetization curve of the perpendicular magnetic recording layer with a thickness of the nonmagnetic intermediate layer of 0 nm (no intermediate layer was formed). The solid line denotes the result of measurement, while squarer plots and triangular plots denote the results of calculation (the calculation method will be described hereinafter). While both Hc of about 6 kOe and Hs of about 12 kOe are smaller than those in Comparative Example 1, the values may be presumed to be too large for sufficient recording with the head when the magnetic recording layer has only one layer (single layer) as in Comparative Example 1. However, since good OW is actually obtained, it may be expected that the mechanism of magnetization reversal is different from the mechanism in the case of the single layer, or the reversal magnetic field for recording with the head is expected to be smaller than that of the single layer medium having the same Hc.

The angle dependency of the remanent coercivity Hc of the perpendicular magnetic recording medium having a thickness of the nonmagnetic intermediate layer of 0 nm (no intermediate layer was formed) is shown by the square plots in FIG. 4. The angle dependency is substantially overlapped with the angle dependency in Comparative Example 1, and seems to be a curve resembling to that of the SW model. It may be supposed that grains in the first magnetic layer and grains in the second magnetic layer are in sufficient exchange coupling since the second magnetic layer is directly formed on the first magnetic layer. Therefore, it may hardly occur that reversal is completed first in the region of the second magnetic layer constituting columnar grains. The prediction that magnetization reversal is approximated by the SW model may be supported by this result.

Since the track width of the medium for evaluating read/write characteristics was almost the same as in Example 1, it may be interpreted that the difference (the difference of normalized Hcr is about 0.1 at 45° and about 0.2 at 75°) of the angle dependency ascribed to the presence and absence of the intermediate layer is not so largely different from Example 1. This supports the interpretation that the difference of the track width between Example 1 and Comparative Example 1 is mainly caused by the difference of OW, and the angle dependency in Example 1 is regarded as approximately the same as that of Comparative Example 1. Accordingly, the same effect as in the medium in which the nonmagnetic intermediate layer was formed may be obtained in the medium in which the nonmagnetic intermediate layer was not formed with respect to the angle dependency of Hcr.

The sweep time dependency of the coercivity Hc of the perpendicular magnetic recording medium having a thickness of the nonmagnetic intermediate layer of 0 nm (no intermediate layer was formed) is shown by the square plots in FIG. 5. As a result of fitting as in Example 1, $H_0$=9.1 kOe and vKu/kT=109 were obtained, and thermal fluctuation resistance was almost the same as that in Example 1 and Comparative Example 1. While $H_0$ is about 0.7 kOe higher and OW is about 4 dB lower than that in Example 1, $H_0$ and OW are clearly improved as compared with the values in Comparative Example 1. It has been shown that OW and SNRm may be improved while almost the same thermal fluctuation resistance is maintained when no nonmagnetic intermediate layer is formed.

Figure 8:
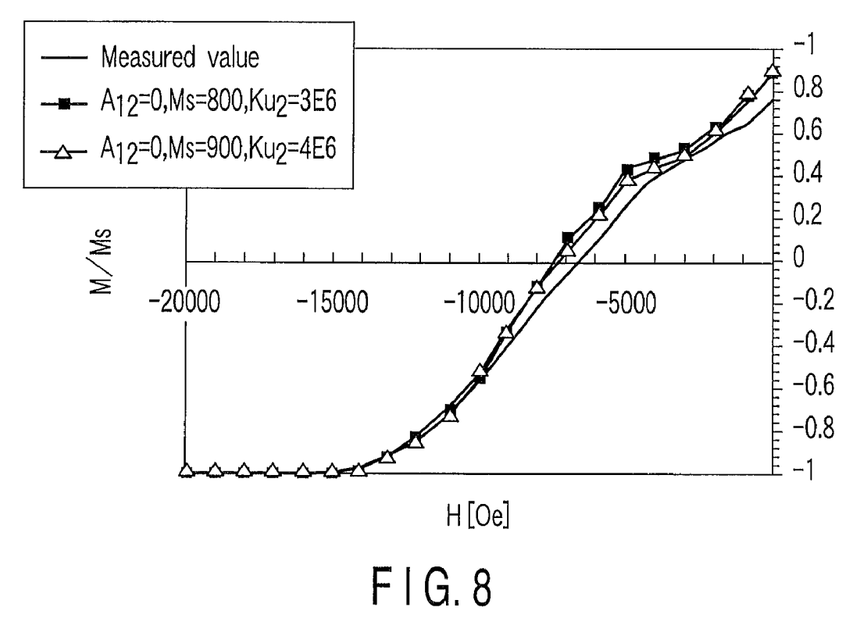
FIG. 8 is a magnetization curve of a perpendicular magnetic recording medium having a nonmagnetic intermediate layer with a thickness of 2 nm in Example 2.

FIG. 8 shows the results of measurement of the magnetization curve of the perpendicular magnetic recording layer comprising a nonmagnetic intermediate layer with a thickness of 2 nm. The solid line denotes the result of measurement, while square plots and triangular plots show the result of calculation. Two-stage form of the magnetization curve suggests that the first magnetic layer and second magnetic layer are independently reversed, and that forming a Pt layer with a thickness of 2 nm has eliminated interaction between the two magnetic layers.

<Simulation>

Magnetic characteristics of the second magnetic layer and the mechanism of magnetization reversal by combining the second magnetic layer with the first magnetic layer were simulated using a commercially available software "LLG Micromagnetics Simulator (produced by M. R. Scheinfein et al.)". While it is needless to say that simulation is effective for the investigation of the mechanism of magnetization reversal, simulation is also considered to be effective for estimating Ku of the second magnetic layer. This is because direct measurement of Ku of the second magnetic layer may encounter various difficulties such that, when Ku is measured as a combined value of the first magnetic layer and second magnetic layer and the measured value is assigned to each layer, the method and accuracy have not been established yet, or such that, when the thickness of the second magnetic layer is increased for easy measurement, or when Ku is measured without forming the first magnetic layer, the structure and magnetic characteristics of the second magnetic layer may be changed from those when the first magnetic layer and second magnetic layer exist together.

As major calculation parameters, the sample size was set to 192×192×20 nm, and the sample was divided into cubic cells with a side length of 4 nm. While the in-plane size of one grain was based on a square with a side length of 8 nm, the cell has a close-packed structure of polygonal grains by forming a Volonoi cell having dispersion of 2 nm. The first magnetic layer and second magnetic layer were 1 nm thicker than those in Example 1, or 16 nm and 4 nm, respectively, for the convenience of the cell size. The temperature was set at 300 K by taking thermal fluctuation into consideration, and the calculation was brought to an end at repeated numbers of 1,000 since the calculation was not converged. The time interval was made to be as large as possible within the range necessary for obtaining a stable solution, and the attenuation constant α was set to 1. Dispersion of the easy axis of magnetization was 5°, and dispersion of Ms and Ku was 20%.

Since there are no difficulties as described above in the measurement of the magnetic characteristics of the first magnetic layer, the characteristics were measured with VSM and a torque magnetometer (TOEI INDUSTRY CO., LTD.). The results were Ms=570 emu/cc and Ku=4.2×10$^6$ erg/cc. Taking dispersion of the values depending on samples of actual media into consideration, $Ms_1$ and $Ku_1$ used for the calculation was rounded off to 600 emu/cc and 4×10$^6$ erg/cc, respectively. The exchange stiffness constant A in the grain was set to 1.0 μerg/cm. The results of calculation by combining the second magnetic layer with the first magnetic layer using these parameters and inter-grain coupling Ex as a variable are shown by square plots (Ex=0.05 μerg/cm) and triangular plots (Ex=0.1 μerg/cm) in FIG. 6. While fine tuning of Ms and Ex is possible, inter-grain coupling of the first magnetic layer was roughly selected to be Ex=0.1 μerg/cm herein.

It is evident that Ms of the second magnetic layer is higher than Ms of the first magnetic layer since Ms of Example 1 was 650 emu/cc, which is higher than Ms in Comparative Example 1. From the results of count back of Ms of the second magnetic layer using an average thickness, $Ms_2$ was ranged from 800 to 900 emu/cc (from 640 to 660 emu/cc averaged with the thickness weighted).

In addition to the above-mentioned calculation conditions, using, as variables, Ms, Ku and Ex of the second magnetic layer and the exchange coupling $A_{12}$ between the first magnetic layer and the second magnetic layer in place of providing nonmagnetic intermediate layer, simulation was carrier out so that the calculated values come close to measured magnetization curves and angle dependency of Hcr when the thickness of the nonmagnetic intermediate layer is 0, 1 nm (Example 1) and 2 nm.

A calculated value that is closest to the measured values from a total point of view was obtained under conditions that $Ms_2$=800 emu/cc, $Ku_2$=3×10$^6$ erg/cc and $Ex_2$=0.2 μerg/cm, or under conditions that $Ms_2$=900 emu/cc, $Ku_2$=4×10$^6$ erg/cc and $Ex_2$=0.2 μerg/cm.

FIGS. 7, 3 and 8 show the results of calculation when $A_{12}$ is 1.0, 0.3 and 0 μerg/cm at the thickness of the nonmagnetic intermediate layer of 0, 1 (Example 1) and 2 nm, respectively. In each graph, the square plots are the results of calculation under conditions that Ms=800 emu/cc and $Ku_2=3 \times 10^6$ erg/cc, and triangular plots are the results of calculation under conditions that Ms=900 emu/cc and $Ku_2=4 \times 10^6$ erg/cc. In each graph, the square plots and triangular plots are almost overlapped.

The measured values were evidently remote from the results of calculation of the above-mentioned results of the two kinds of calculation by increasing or decreasing only $Ms_2$ in an order of 100 emu/cc, by increasing or decreasing only $Ku_2$ in an order of $1 \times 10^6$ erg/cc, or by increasing or decreasing only $Ex_2$ in an order of 0.1 μerg/cm in the respective results of calculation described above. On the other hand, since a tendency that the magnetization curve is not so largely changed is obtained by changing Ms and Ku in proportion to one another, it may be expected that the results close to the calculation results may be obtained at the midpoint of two kinds of calculation results (for example, under conditions that Ms=850 emu/cc and $Ku_2=3.5 \times 10^6$ erg/cc). Based on the above-mentioned results, it may be presumed that Ku of the second magnetic layer is from $3 \times 10^6$ to $4 \times 10^6$ erg/cc that is approximately as high as Ku of the first magnetic layer.

While Ku of bulk Co (hcp) was $4.53 \times 10^6$ erg/cc, $K_1$ and $K_2$ of the cubic crystal magnetic anisotropy constants of fcc-Co manufactured as thin films were reported to be in the order of from $0.5 \times 10^6$ to $0.7 \times 10^6$ erg/cc and $1 \times 10^4$ erg/cc, respectively (T. Suzuki et al., Appl. Phys. Lett. 64, p. 2736: J. A. Wolf et al., Appl. Phys. Lett. 65, p. 1057). While it is difficult to directly analyze the crystal structure by X-ray or electron beam diffraction since the second magnetic layer is as thin as 3 nm, it may be appropriate to consider that the crystal structure of Co in the second magnetic layer is hcp from the magnitude of Ku. The composition and packing ratio of crystal grains of the actually manufactured second magnetic layer were not investigated due to difficulty of analysis. However, it may be speculated that Ku is lowered in a proportion of low packing ratio since the layer has a granular structure, while Ku increases at the interface with the Pt intermediate layer due to interfacial magnetic anisotropy or alloying. It is highly probable that a CoPt alloy is formed by diffusion of Pt, and the same effect may be expected by forming the intermediate layer with Pd.

Ku of the second magnetic layer is large as described above, and Ms is larger than that in the first magnetic layer. Since the magnitude of the reversal magnetic field is based on the anisotropic magnetic field Hk=2 Ku/Ms, $Hk_1$ and $Hk_2$ are calculated as 13.3 kOe and from 7.5 to 8.9 kOe, respectively. In other words, Hk of the second magnetic layer is evidently smaller than Hk of the first magnetic layer due to high Ms of the second magnetic layer, although Ku is also high.

Accordingly, it may be supposed that magnetization reversal of the region of the second magnetic layer starts first in one columnar grain when coupling between the first magnetic layer and the second magnetic layer is weakened by forming the nonmagnetic intermediate layer. The mechanism of magnetization reversal was actually observed through simulation. Magnetization of the second magnetic layer is reversed first followed by magnetization reversal of the first magnetic layer after completing magnetization reversal of the second magnetic layer under the condition that $A_{12}=0$ μerg/cm as will be evident from FIG. 8. Under the condition that $A_{12}=0.3$ μerg/cm, magnetization of the second magnetic layer is reversed first, and magnetization of the first magnetic layer is reversed immediately after magnetization reversal of the second magnetic layer in one columnar grain.

Under the condition that $A_{12}=1.0$ μerg/cm, it was observed that while magnetization of the entire columnar grain was certainly reversed at once, magnetization of the second magnetic layer was tilted first. This resembles to the reversal mechanism indicated by R. H. Victora et al., IEEE Transactions on Magnetics, vol. 41, p. 537. The optimum value of the intensity of interlayer coupling seems to be different from that in R. H. Victora et al., IEEE Transactions on Magnetics, vol. 41, p. 537 since half of the magnetic layer is a soft magnetic region with Ku=0 in the above document and the model and parameters of the calculation are different from the above document. However, the fact that the region with low Hk starts to reverse is common in all the reversal mechanisms, and reduction of Hc and large improvement of OW are realized as has been described above as compared with the case where the magnetic layer is a single layer (Comparative Example 1). Accordingly, the effect of low Hk of the second magnetic layer may be obtained without the nonmagnetic intermediate layer in terms of the mechanism of magnetization reversal.

Ku of the CoCrPt—$SiO_2$ recording layer, that is currently a main stream, is about $4 \times 10^6$ erg/cc. It is not preferable to largely reduce Ku, rather it is, necessary to enhance Ku, in terms of making HDD high density and size reduction of grains of the recording layer and in terms of accompanying improvement of thermal fluctuation resistance. It is also considered that $Ku_1$ and $Ku_2$ are preferably $3 \times 10^6$ erg/cc or more since Ku of the second magnetic layer was in the range from $3 \times 10^6$ to $4 \times 10^6$ erg/cc that is approximately the same as or a little lower than Ku of the first magnetic layer in the above-mentioned examples. While lowering Hk by increasing Ms of the second magnetic layer is crucial so long as the difference of Ku is not so large (for example in the order of one digit), the same effect may be obtained when Ku is $4 \times 10^6$ erg/cc or more within the range as described above.

With respect to the thickness of the magnetic layer, thickening the second magnetic layer is not preferable for making the recording layer high density since Hk of the entire recording layer, or Hc, decreases to allow the track width to be widen due to an increase ratio of the region having low Hk. Thickening the magnetic layer is liable to affect readout signals and medium noise since Ms is large. While it is known that the medium noise may be decreased by increasing the Cr composition to a certain extent in CoCr-based recording layers including the CoCrPt—$SiO_2$ recording layer, it is not preferable to add Cr to the second magnetic layer since Cr is liable to largely decrease Ms. In general, reducing the medium noise is difficult since additives are required to be reduced for obtaining high Ms. Accordingly, it may be preferable that the second magnetic layer is thinner than the first magnetic layer.

Therefore, it be suggested that an effect for improving the medium noise, thermal stability and overwrite characteristics may be obtained when both $Ku_1$ and $Ku_2$ are $3 \times 10^6$ erg/cc or more, $Ms_1$ is smaller than $Ms_2$, $Hk_1$ is larger than $Hk_2$ and $t_1$ is larger than $t_2$.

While a material that allows high Ms to be compatible with high Ku is 3d transition metal Co and may include Pt and Pd in terms of extension of conventional HDD media, it is not preferable to add Cr as described above. CoCrPt—$SiO_2$ having high Ku and practical in SNRm is thought to be also preferable for the first magnetic layer as described above.

Figure 9:
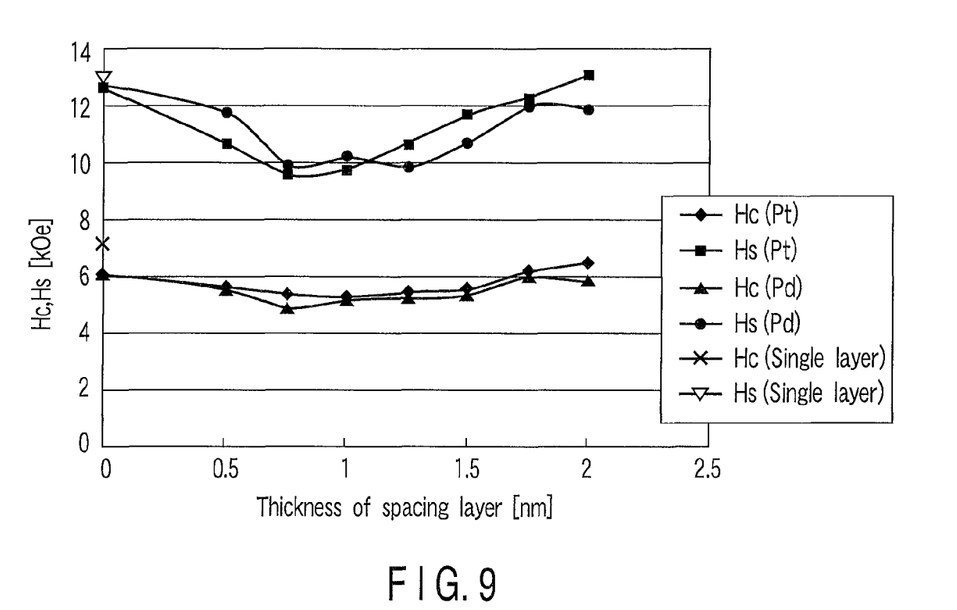
FIG. 9 is a graph showing dependency of Hc and Hs on the thickness of the intermediate layer with respect to the perpendicular magnetic recording medium in Example 2.

FIG. 9 shows the results of plotting Hc and Hs against the thickness of the intermediate layer with respect to the perpendicular magnetic recording medium in which the thickness of the intermediate layer was changed from 0 to 2 nm. The results when the nonmagnetic intermediate layer was changed to Pd are also plotted. The case of the Pt intermediate layer is shown by rhombic plots (Hc) and square plots (Hs) while the case of the Pd intermediate layer is shown by triangular plots (Hc) and circular plots (Hs). Since substantially the same effect have been obtained by changing Pt to Pd, a material prepared by mixing Pt and Pd may be used for the intermediate layer.

Now, the magnetization curve in FIG. 7 in which the thickness of the intermediate layer is 0 nm, the magnetization curve in FIG. 3 in which thickness of the intermediate layer is 1 nm, the magnetization curve in FIG. 8 in which the thickness of the intermediate layer is 2 nm and interlayer coupling is eliminated, and the continuous change in FIG. 9 are collectively considered. In this case, interlayer coupling is not antiferromagnetic but always ferromagnetic. Therefore, the magnitude of interlayer coupling is considered to be decreased with the increase of the thickness of the intermediate layer. These graphs show that the upper and lower layers are appropriately weakly coupled at a thickness around 1 nm, and Hc and in particular Hs are most reduced.

The mechanism of magnetization reversal when the upper and lower layers are appropriately coupled has been already described. The mechanism that magnetization of the second magnetic layer in the columnar grain is reversed first to accelerate magnetization reversal of the first magnetic layer may be contributive to reduction of Hc and Hs. Accordingly, it may be concluded that better results may be obtained by providing a nonmagnetic intermediate layer in a range of thickness enough for providing ferromagnetic coupling between the first magnetic layer and the second magnetic layer.

Since the second magnetic layer showed stronger inter-grain coupling with $Ex_2=0.2$ μerg/cm as contrasted to $Ex_1=0.1$ μerg/cm of the first magnetic layer, inter-grain coupling seems to help the second magnetic layer to be reversed first. While this is speculation from simulation, it is evident that some inter-grain coupling works in the entire medium (average) since the gradient α at Hc of a medium having no nonmagnetic intermediate layer with a relatively small slop of the magnetization curve (FIG. 7) is represented by $α=4π·dM/dH=4π·650/4500≈1.8$, which is evidently larger than $α=1$ as a standard of α when no inter-grain coupling is present. Inter-grain coupling to an extent that does not impair SNRm may be preferable for making the perpendicular squareness Rs to be approximately 1 and for ensuring a nucleation magnetic field Hn as large as possible.

High Ku of the second magnetic layer is responsible for increasing Rs and Hn by enhancing Hk without reducing Ku as an average of the entire recording layer. While a composite media using a soft magnetic layer with Ku=0 has been introduced as a method for relatively easily manufacturing a tilted media in which the easy axis of magnetization is tilted from a perpendicular direction (R. H. Victoria et al., IEEE Transactions on Magnetics, Vol. 41, p. 537), it is considered to be preferable to enhance Ku so that the second magnetic layer is perpendicularly magnetized in order to enhance Rs and Hn.

EXAMPLE 3

A perpendicular magnetic recording medium was manufactured in the same manner as in Examples 1 and 2 in which nonmagnetic intermediate layer was not formed, except that the composition (design value) of $SiO_2$ in the second magnetic layer was changed in the range from 0 to 40 vol %.

Figure 10:
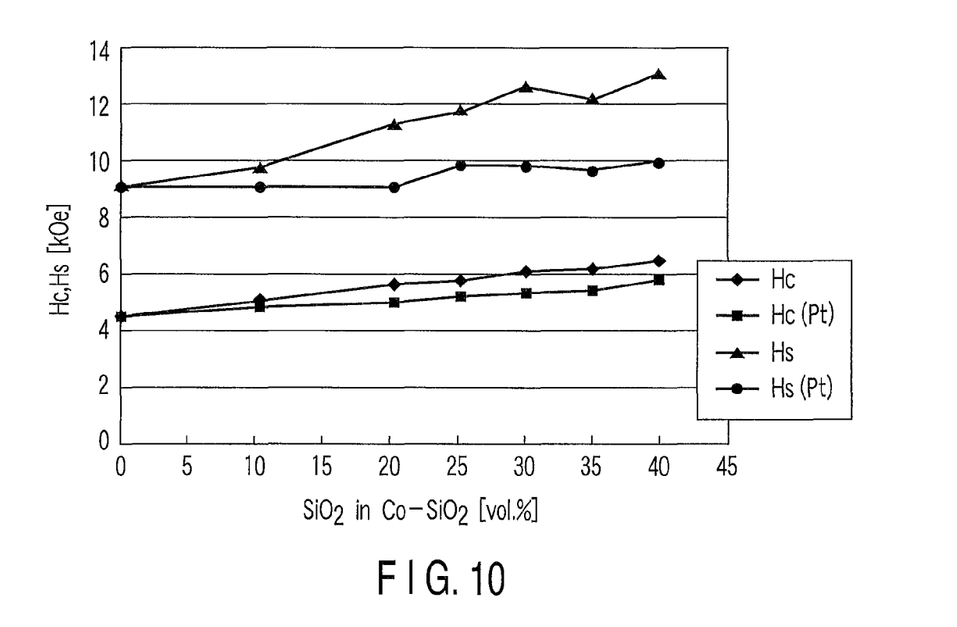
FIG. 10 is a graph showing dependency of Hc and Hs on the $SiO_2$ composition with respect to a perpendicular magnetic recording medium in Example 3.

FIG. 10 shows $SiO_2$ composition dependency of Hc and Hs. The square plots (Hc) and circular plots (Hs) denote the case where the Pt nonmagnetic intermediate layer was formed, while the rhombic plots (Hc) and triangular plots (Hs) denote the case where no nonmagnetic intermediate layer was formed. While Hs seems to be more or less saturated when the intermediate layer was formed, both Hc and Hs basically tend to increase with increasing the $SiO_2$ composition. While Hc and Hc(Pt), and Hs and Hs(Pt) are approximately the same value irrespective of the presence or absence of the intermediate layer when the $SiO_2$ composition is 0 vol %, differences are caused between Hc and Hc(Ot), and Hs and Hs(Pt), by adding $SiO_2$. The difference between Hs and Hc is small at a $SiO_2$ composition of about 30 vol %, and a magnetization curve having a large gradient may be obtained.

The angle dependency of Hcr when the composition of $SiO_2$ is 0 vol % is shown by the rhombic plots in FIG. 4. It is shown that Hcr increases by tilting the angle of the magnetic field as compared with Hcr when $SiO_2$ is added (square plots). However, the difference of the read/write characteristics is not so large from those of a medium having a single layer (dotted line) as hitherto described when the intermediate layer having the largest Hcr is formed (triangular plots). Since the rhombic plots are between the square plots and the triangular plots, it may be anticipated that they provide similar results.

The above-mentioned results suggest that addition of $SiO_2$ is not essential but preferable since it is possible to obtain an effect for increasing Hc and an effect for suppressing Hs when an intermediate layer is provided.

The same result was obtained by using $Cr_2O_3$ and $TiO_2$ in place of $SiO_2$.

EXAMPLE 4

A perpendicular magnetic recording medium was manufactured in the same manner as in Examples 1 and 2 in which no nonmagnetic intermediate layer was formed, except that the thickness of the second magnetic layer was changed in the range from 0 to 5 nm.

Figure 11:
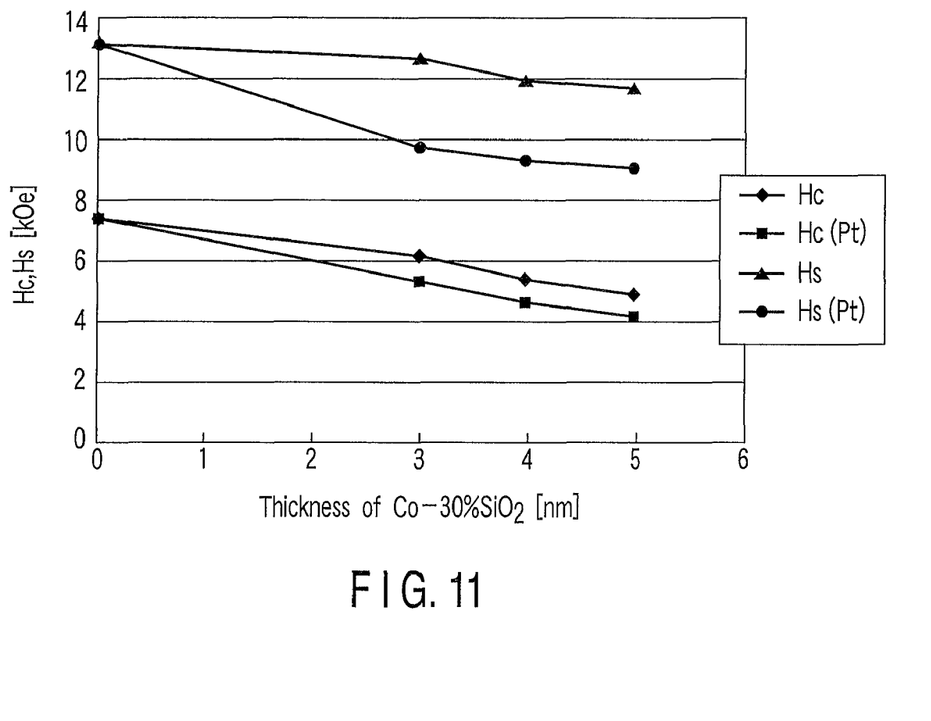
FIG. 11 is a graph showing dependency of Hc and Hs on the thickness of a second magnetic layer with respect to a perpendicular magnetic recording medium in Example 4.

FIG. 11 shows dependency of Hc and Hs on the thickness of the second magnetic layer. Square plots (Hc) and circular plots (Hs) denote the case where the Pt nonmagnetic intermediate layer was formed, while rhombic plots (Hc) and triangular plots (Hs) denote the case where the nonmagnetic intermediate layer was not formed. While Hc and Hs basically tend to decrease with the increase in thickness of the layer, a difference is caused depending on the absence/presence of the intermediate layer, as in the case of $SiO_2$ composition dependency. It is shown that a magnetization curve having a small difference between Hs and Hc, which is largely inclined, may be obtained at a thickness of around 3 nm of the second magnetic layer by providing the Pt intermediate layer.

While there is no large difference at a thickness of 5 nm of the second magnetic layer, it is preferable that the thickness of the second magnetic layer is smaller than at least that of the first magnetic layer since an increasing tendency of the medium noise is anticipated by increasing the thickness of the second magnetic layer.

EXAMPLE 5

A magnetic recording apparatus was manufactured by combining each of the perpendicular magnetic recording media in the above Examples with the same head as used for spin stand evaluation.

When a bit error rate was evaluated by read/write operation, the bit error rate was improved corresponding to the improvement of SNRm. However, evaluation with a ring head for longitudinal magnetic recording gave a poor error bit rate as compared with the single-pole head. It has been found that the single-pole head is preferable since SNRm and write resolution may be decreased due to decrease of recording ability ascribed to the difference of the configuration of the write element.

While effectiveness of the perpendicular magnetic recording medium on the magnetic recording apparatus has been described, the invention is not restricted to the magnetic disk apparatus in terms of the properties of the magnetic recording medium in which the effect of the invention is exerted. Rather, the effect may be manifested in the entire magnetic recording apparatus which employs the perpendicular magnetic recording method without depending on the shape of the magnetic recording medium such as a tape medium and a drum medium.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A perpendicular magnetic recording medium comprising:
    a substrate; and
    a first magnetic layer and a second magnetic layer formed on the substrate,
    wherein, for the first and second magnetic layers, respectively, uniaxial magnetic anisotropy constants are $Ku_1$ and $Ku_2$, saturation magnetizations are $Ms_1$ and $Ms_2$, anisotropic magnetic fields are $M_1$ and $Hk_2$, and the thicknesses are $t_1$ and $t_2$, then following conditions are satisfied:
    $Ku_1$ and $Ku_2$ are $3 \times 10^6$ erg/cc or more;
    $Ms_1$ is smaller than $Ms_2$;
    $Hk_1$ is larger than $Hk_2$; and
    $t_1$ is larger than $t_2$.

2. The perpendicular magnetic recording medium according to claim 1, wherein the first magnetic layer includes crystal grains comprising Co, Pt and Cr and amorphous grain boundaries, and the second magnetic layer includes Co but no Cr.

3. The perpendicular magnetic recording medium according to claim 1, wherein the second magnetic layer includes only Co or contains Co and at least one of Pt and Pd.

4. The perpendicular magnetic recording medium according to claim 1, wherein the second magnetic layer includes amorphous grain boundaries comprising at least one selected from the group consisting of Si, Cr and Ti in a larger proportion than in crystal grains.

5. The perpendicular magnetic recording medium according to claim 1, further comprising a nonmagnetic intermediate layer between the first magnetic layer and second magnetic layer, the first magnetic layer and second magnetic layer being ferromagnetically coupled.

6. The perpendicular magnetic recording medium according to claim 5, wherein the nonmagnetic intermediate layer includes at least one of Pt and Pd.

7. The perpendicular magnetic recording medium according to claim 1, wherein a perpendicular squareness is approximately 1.

8. The perpendicular magnetic recording medium according to claim 1, wherein an inclination $\alpha$ of a perpendicular magnetization curve at coercivity Hc is 1 or more.

9. The perpendicular magnetic recording medium according to claim 1, further comprising a soft magnetic underlayer comprising Co and Zr between the substrate and the first magnetic layer.

10. The perpendicular magnetic recording medium according to claim 9, further comprising a nonmagnetic underlayer comprising Ru between the soft magnetic underlayer and the first magnetic layer.

11. The perpendicular magnetic recording medium according to claim 10, further comprising a seed layer comprising at least one selected from the group consisting of Pd, Pt, Ni, Ta and Ti between the soft magnetic underlayer and the nonmagnetic underlayer.

12. A magnetic recording apparatus comprising:
    the perpendicular magnetic recording medium according to claim 1; and a single-pole type magnetic recording head.

* * * * *